United States Patent
De Groot et al.

(10) Patent No.: US 6,389,748 B1
(45) Date of Patent: *May 21, 2002

(54) PLANT CUBES

(75) Inventors: Jacob Frank De Groot, Roermond (NL); Lars Hansen, Frederiksberg (DK)

(73) Assignee: Rockwool/Grodan B.V. (NL)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/750,910
(22) PCT Filed: Jul. 6, 1995
(86) PCT No.: PCT/EP95/02698
 § 371 Date: Mar. 26, 1997
 § 102(e) Date: Mar. 26, 1997
(87) PCT Pub. No.: WO96/02128
 PCT Pub. Date: Feb. 1, 1996

(30) Foreign Application Priority Data

Jul. 13, 1994 (EP) .......... 94 202031

(51) Int. Cl.[7] .......... A01G 31/00
(52) U.S. Cl. .......... 47/64
(58) Field of Search .......... 47/64

(56) References Cited

U.S. PATENT DOCUMENTS

| 4,777,763 A | * 10/1988 | Shannon et al. | 47/64 |
| 5,035,080 A | * 7/1991 | Kafka | 47/64 |
| 5,060,419 A | * 10/1991 | de Graaf et al. | 47/64 |

FOREIGN PATENT DOCUMENTS

| AU | 0645015 | * 1/1991 | 47/64 |
| EP | 0209958 | 1/1987 | A01G/31/00 |
| EP | 0280338 | * 8/1988 | 47/64 |
| EP | 0416838 | * 3/1991 | 47/64 |
| GB | 2106764 | * 4/1983 | 47/64 |
| WO | 8901736 | 3/1989 | A01G/31/00 |
| WO | 09 5004453 | * 2/1995 | 47/64 |

* cited by examiner

*Primary Examiner*—Peter M. Poon
(74) *Attorney, Agent, or Firm*—Webb Ziesenheim Logsdon Orkin & Hanson, P.C.

(57) ABSTRACT

This invention relates to a plant cube, comprising a block of mineral fibres, having a top surface, a bottom surface and four side surfaces, which block comprises a laminated structure of in parallel orientated mineral wool fibres, wherein preferably the laminated structure comprises substantially vertically orientated fibres, or wherein preferably the laminated structures comprises substantially horizontally orientated fibres.

9 Claims, 2 Drawing Sheets

PLANT CUBES

BACKGROUND OF THE INVENTION

1. Field of the Invention

The present invention relates to a plant cube, and in particular to a plant cube having a laminated structure of mineral wool fibres oriented in parallel to each other. The mineral wool fibres are predominantly formed into a coherent matrix and mutually bonded by a cured binding agent and, if appropriate, impregnated with a wetting agent for rapid water uptake before use. The mineral wool fibres may be stone wool fibres, glass fibres, Slag fibres and the like.

2. Description of the Prior Art

The air and water distribution within the growth cube is dependent on the hydraulic pressure over the height of the growth cube, but also is dependent on the internal surface value of the growth cube. The internal surface value is a function of the density of the growth cube, of the fibre diameter of the mineral wool fibres used and of the content of non-fibre material (shot).

Growth cubes have a total density within the ranges of 5–200 kg/m$^3$, preferably between 20–180 kg/m$^3$, more preferably 40–120 kg/m$^3$, and practically 50–70 kg/m$^3$. The fibre diameter is normally within the range of 1–20 micrometers, preferably 2–10 micrometers, such as 3–8 micrometers. The relative amount of shot varies between 0–50 wt % and typically is 0–40 wt %. For stone wool, the amount of shot is normally 30–35 wt %, and for glass wool the amount of shot is 5–10 wt %. Furthermore the aspect ratio for shot (ratio of length over diameter) is normally less than 5.

The value for the internal surface varies between 5,000 and 20,000 m$^2$/m$^3$. A high internal surface value is in the range of 16,000–20,000 m$^2$/m$^3$, a low value is in the range of 5,000–8,000 m$^2$/m$^3$ and a moderate value is in the range of 9,000–15,000 m$^2$/m$^3$.

An object of the invention is to provide new growth cubes which possess improved properties, such as better water distribution, better air distribution, better root penetration and distribution, and also better compression or bending strength.

SUMMARY OF THE INVENTION

New growth substrates have become available because of the use of a new technology for the production of growth substrates, that is, the provision of substrates comprising at least one layer of short tranversely extending fibres. Such a layer is produced by superfolding, in upward and downward directions, a web of mineral wool fibres. The fibres in the web are predominately horizontally oriented. The resulting product includes a folded or zigzagged structure positioned in a longitudinal direction formed from a layer of short transversely positioned mineral wool fibres. Each fold has a width in the range of 2–50 mm, preferably 4–40 mm or 2–40 mm.

The present invention provides a plant cube, comprising a laminated structure of parallel mineral wool fibres which impart the plant cube with better water spreading, water drainage, plant rooting and distribution. These features are dependent on the orientation of the mineral wool fibres in relation to the top and bottom surface.

Accordingly, the present invention includes a plant cube comprising a block of mineral fibres, having a top surface, a bottom surface and four side surfaces. The block comprises a laminated structure of parallel mineral wool fibres.

When the plant cube comprises substantially vertically oriented fibres, the plant cube provides improved water drainage, plant root penetration and distribution. Furthermore, less waste material is formed. Additionally, the plant cube has better contact with a slab on which the plant cube eventually is placed during outgrowth due to a better hydraulic contact. Furthermore, this plant cube is more coherent, rigid and stable.

In an alternative embodiment, the laminated structures comprise substantially horizontally oriented fibres. The resulting plant cube provides better water spreading. Therefore depending on the type of plant to be grown on the plant cube, either of the two plant cube types may be selected.

A third embodiment of the plant cube includes a pair of side layers of mineral wool fibres forming two mutually parallel side surfaces. The fibres of the side layers are oriented perpendicular to the fibres of the laminated structure. The resulting plant cube has high compression strength at the side layers which improves the form stability of the plant cube. A bottom surface of the plant cube may further define a groove between the side layers to provide additional strength.

When the laminated structure is subdivided into at least two substructures by a. division layer of mineral wool fibres oriented parallel to the fibres of the side surfaces, an optimum compression strength is obtained due to the presence of the division layer. Grooves may be defined in a bottom of the plant cube between each side layer and the division layer to provide additional strength.

When the bottom surface has a profile corresponding to a curing oven used to form the plant cube, the plant cube has a top surface which allows maximum penetration of water during dripping.

The effects of the plant cube according to the invention are maximized when the height of the side layers and the division layers is greater than that of the adjoining laminated structure.

The described benefits and other advantages and features of the plant cube according to the invention will be apparent from the following description of plant cubes according to the invention, which description should not be considered as limiting the scope of the invention.

DETAILED DESCRIPTION OF THE PREFERRED EMBODIMENTS

Figure 1:
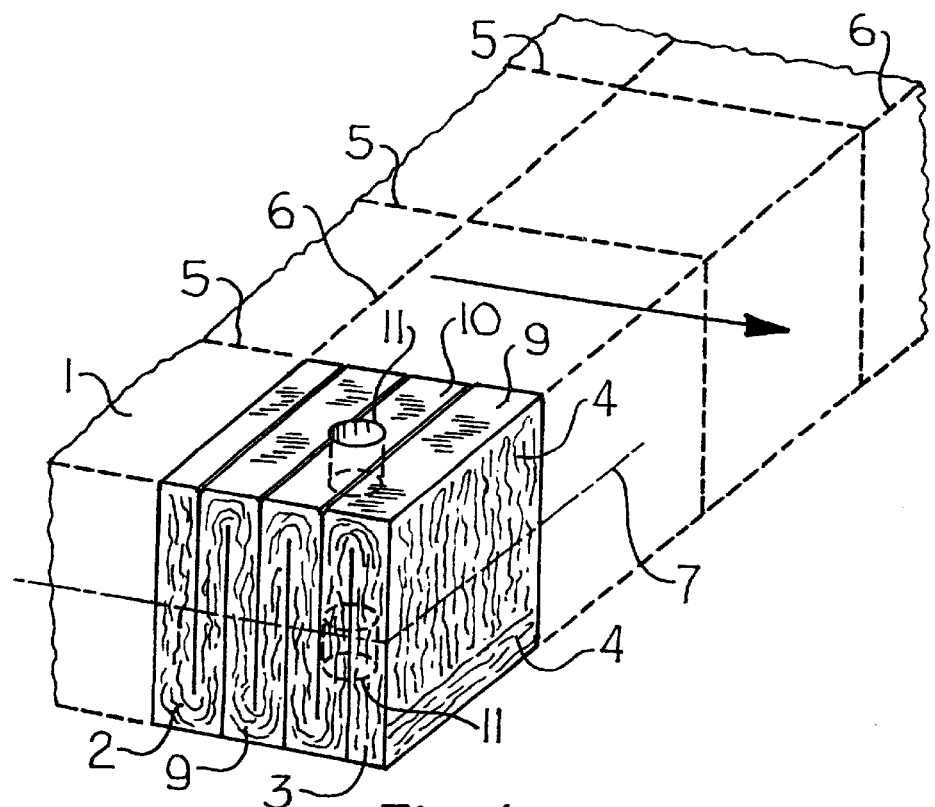
FIG. 1 shows a plant cube and production thereof according to the invention.

FIG. 1 shows a slab 1 of a matrix of mineral fibres virtually connected by a cured binding agent. This slab comprises a vertically laminated structure 2 of a zigzagged folded layer 3.

Plant cubes 4 according to the invention are formed out of the slab 1 by cutting along the cutting lines 5–7. The outer surfaces 8 and 9 have an oven profile in which plant openings 11 are defined. The surfaces 8 and 9 form the top surfaces of the plant cubes 4.

Figure 2:
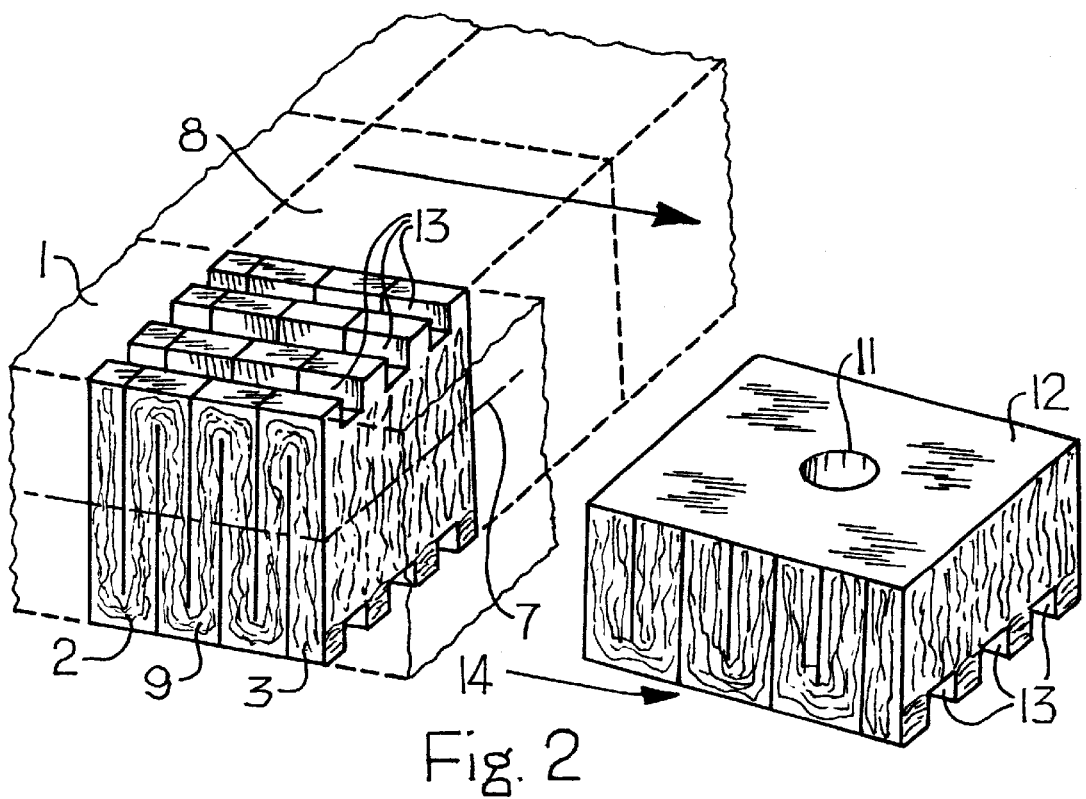
FIG. 2 shows another plant cube and production thereof according to the invention.

FIG. 2 shows the same production method of the slab 1 having the laminated structure 2 of zigzagged formed layer 3, but in this embodiment the plant openings 11 are defined in cutting surfaces 12 formed along the cutting line 7. A plurality of grooves 13 are formed in the outer surfaces 8 and 9 corresponding to a curing oven profile resulting in the plant cube 14.

Figure 3:
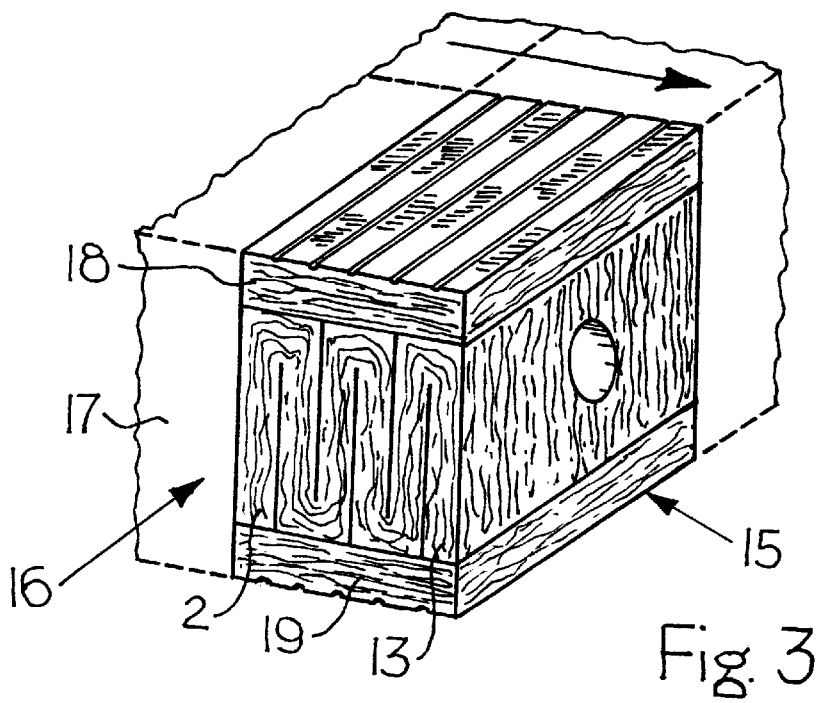
FIG. 3 shows yet another plant cube and production thereof according to the invention.

FIG. 3 shows the production of another plant cube 15 according to the invention. A slab 16 comprises a mid layer 17 having the laminated structure 2 formed by the zigzagged layer 3. The mid layer 17 is interposed between two outer layers 18 and 19 in which the fibres are oriented perpendicular to those of the mid layer 17. The slab 16 is formed by merging the mid layer 17 and the layers 18 and 19 after the mid layer 17 is superfolded.

Figure 4:
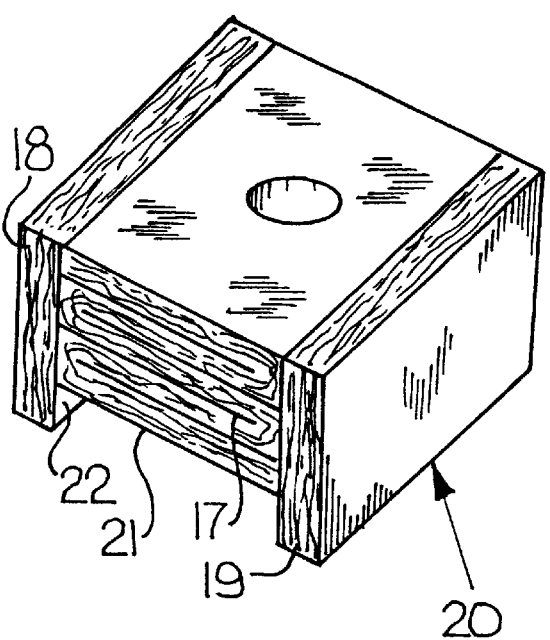
FIG. 4 shows another embodiment of a plant cube according to the invention.

FIG. 4 shows another plant cube 20 according to the invention which differs from the plant cube 15 in that a bottom surface 21 is provided with a groove 22 formed between two side layers 18 and 19. A height of each of the side layers 18 and 19 is greater than a height of the mid layer 17.

Figure 5:
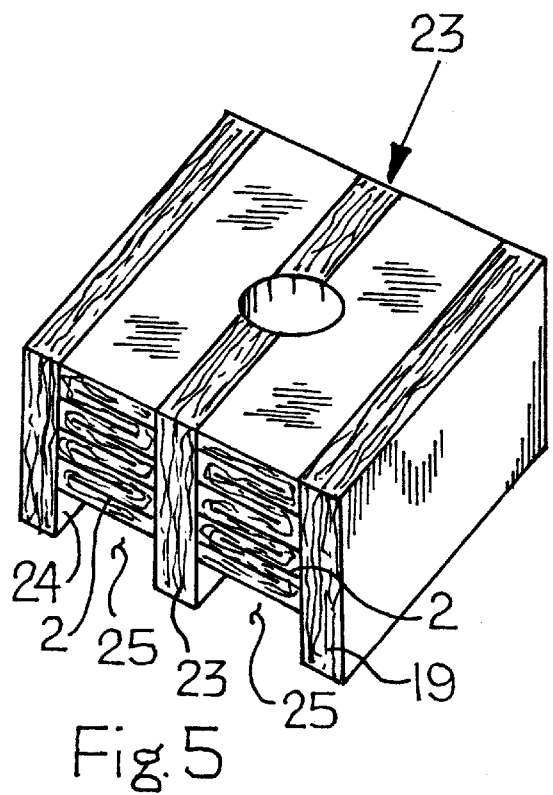
FIG. 5 shows yet another embodiment of a plant cube according to the invention.

Finally, FIG. 5 shows a plant cube 23 comprising two structures 2, two outer layers 18 and 19 and a division layer 23 disposed between the structures 2. A bottom surface 24 is provided with a pair of grooves 25 extending between each side layer 18 and 19 and the division layer 23. A height of each of the side division layers 22 is greater than a height of either of the two structures 2.

As shown in FIGS. 1 and 2, the structure 2 comprises mineral wool fibres extending in the plant cube vertically relative to the top surface.

The plant cubes 15, 20 and 23 depicted in FIGS. 3, 4 and 5 respectively include the structures 2 having fibres extending substantially horizontally with respect to each top and bottom surface and having side layers and optionally a division layer having fibres extending substantially vertically.

We claim:

1. A plant cube comprising a block of mineral fibers, the block having a top surface, a bottom surface and four side surfaces, wherein the block comprises a laminated structure formed from a superfolded layer of parallel oriented mineral wool fibers, thereby forming a plurality of sublayers connected by bends in the layer, wherein all the mineral fibers in the sublayers are parallel to each other.

2. The plant cube as claimed in claim 1, wherein the laminated structure comprises substantially vertically oriented fibres.

3. The plant cube as claimed in claim 1, wherein the laminated structure comprises substantially horizontally oriented fibres.

4. A plant cube comprising a block of mineral fibers, the block having a top surface, a bottom surface and four side surfaces, wherein the block comprises a laminated structure of parallel oriented mineral wool fibers and further comprising two mutually parallel side layers of mineral wool fibers oriented perpendicular to the fibers of the laminated structure, wherein said side layers form two of said four side surfaces.

5. The plant cube as claimed in claim 4, wherein the laminated structure is subdivided into at least two substructures by a division layer of mineral wool fibres oriented parallel to the fibres of the side surfaces.

6. The plant cube as claimed in claim 4, wherein the bottom surface is provided with at least one groove formed between the side layers.

7. The plant cube as claimed in claim 1, where the bottom surface is provided with a curing oven profile.

8. The plant cube as claimed in claim 5, where a height of the side layer and/or a height of the division layer is greater than a height of the laminated structure.

9. The plant cube as claimed in claim 5, wherein the bottom surface is provided with a pair of grooves formed between each of the side layers and the division layer.

* * * * *